(12) United States Patent
Itoh et al.

(10) Patent No.: US 6,326,098 B1
(45) Date of Patent: Dec. 4, 2001

(54) ELECTROCATALYST, AND ELECTRODES, MEMBRANE-ELECTRODE ASSEMBLY AND SOLID POLYMER ELECTROLYTE FUEL CELLS, USING SAID ELECTROCATALYST

(75) Inventors: Takashi Itoh, Ichikawa; Junji Sato, Urayasu, both of (JP)

(73) Assignee: N. E. Chemcat Corporation, Tokyo (JP)

( * ) Notice: Subject to any disclaimer, the term of this patent is extended or adjusted under 35 U.S.C. 154(b) by 0 days.

(21) Appl. No.: 09/296,633

(22) Filed: Apr. 23, 1999

(30) Foreign Application Priority Data

Apr. 23, 1998 (JP) .................................. 10-129510

(51) Int. Cl.[7] ............................. H01M 4/86; H01M 4/90; H01M 4/96; H01M 8/10

(52) U.S. Cl. .................................. 429/40; 429/33; 429/44

(58) Field of Search ................................. 429/40, 44, 33

(56) References Cited

U.S. PATENT DOCUMENTS

| | | | | |
|---|---|---|---|---|
| 3,899,354 | * | 8/1975 | Kordesch | 136/86 D |
| 4,031,292 | * | 6/1977 | Hervert | 429/40 |
| 4,141,801 | * | 2/1979 | Perry | 204/2.1 |
| 4,294,608 | * | 10/1981 | Sedlak et al. | |
| 5,084,144 | * | 1/1992 | Reddy et al. | 205/104 |
| 5,314,760 | * | 5/1994 | Tsou et al. | 429/12 |
| 5,350,643 | * | 9/1994 | Imahashi et al. | 429/33 |
| 5,501,915 | * | 3/1996 | Hards et al. | 429/42 |
| 5,607,785 | * | 3/1997 | Tozawa et al. | 429/33 |
| 5,648,307 | * | 7/1997 | Yasuda et al. | 502/101 |
| 5,677,074 | * | 10/1997 | Serpico et al. | 429/43 |
| 5,767,036 | * | 6/1998 | Freund et al. | 502/185 |
| 5,876,867 | * | 3/1999 | Itoh et al. | 429/44 |
| 5,922,488 | * | 7/1999 | Marucchi-Soos et al. | 429/44 |
| 5,939,220 | * | 8/1999 | Gunner et al. | 429/40 |
| 6,040,077 | * | 3/2000 | Debe et al. | 429/40 |
| 6,066,410 | * | 5/2000 | Auer et al. | 429/40 |
| 6,130,175 | * | 10/2000 | Rusch et al. | 442/77 |

FOREIGN PATENT DOCUMENTS

| | | |
|---|---|---|
| 0 557 673 | 9/1993 | (EP) . |
| 3-22361 | 1/1991 | (JP) . |
| 6-260207 | 9/1994 | (JP) . |
| 9-35723 | 2/1997 | (JP) . |
| WO 97/21256 | 6/1997 | (WO) . |
| WO 99 19066 | 4/1999 | (WO) . |

OTHER PUBLICATIONS

D.W. McKee, et al., J. Electrochemical Technology, vol. 6, No. 3–4, pp. 101–105, "Electrocatalysts for Hydrogen/Carbon Monoxide Fuel Cell Anodes", Mar.–Apr., 1968.

W. Chrzanowski, et al., vol. 14, No. 08, pp. 1967–1970, "Surface Structure Effects in Platinum/Ruthehuim Methanol Oxidation Electrocatalysis," Mar. 15, 1998.

B. Gurau, et al. vol. 102, pp. 9997–10003, "Structural and Electrochemical Characterization of Binary, Ternary and Quaternary Platinum Alloy Catalysts for Methanol Electro–Oxidation," Mar. 12, 1998.

(List continued on next page.)

Primary Examiner—Tom Dunn
Assistant Examiner—L. Edmondson
(74) Attorney, Agent, or Firm—Oblon, Spivak, McClelland, Maier & Neustadt, P.C.

(57) ABSTRACT

There are provided an electrocatalyst having an excellent poisoning resistance to carbon monoxide for use in solid polymer electrolyte fuel cells, an electrode, a membrane-electrode assembly, and a solid polymer electrolyte fuel cell, using said electrocatalyst. The electrocatalyst is comprised of a cubic platinum-ruthenium solid solution alloy and a hexagonal ruthenium supported together on a conductive carbon carrier.

18 Claims, 1 Drawing Sheet

OTHER PUBLICATIONS

Patent Abstracts of Japan, vol. 013, No. 002 (E–700), Jan.. 6, 1989, JP 63 213260, Sep. 6, 1988.

Patent Abstracts of Japan, vol. 015, No. 147 (E–1055), Apr. 12, 1991, JP 03 022361, Jan. 30, 1991.

China Chemicals Carbon Black Specification, pp. 1 and 2 printed from web page www.china–chemicals.com, Nov. 2000.*

* cited by examiner

ELECTROCATALYST, AND ELECTRODES, MEMBRANE-ELECTRODE ASSEMBLY AND SOLID POLYMER ELECTROLYTE FUEL CELLS, USING SAID ELECTROCATALYST

BACKGROUND OF THE INVENTION

1. Field of the Invention

The present invention relates to an electrocatalyst having a good poisoning resistance to carbon monoxide, and also relates to an electrode and a membrane-electrode assembly each using said electrocatalyst, and further relates to a solid polymer electrolyte fuel cell using the same.

2. Description of the Prior Art

Since solid polymer electrolyte fuel cells have a high output power density and work at low temperatures and also scarcely evolve an exhaust gas containing harmful substances, they are expected as a propulsion power source for transportation means to replace internal combustion engines.

In the fuel cells a fuel gas such as hydrogen or methanol gas is fed to a fuel electrode (anode) and air or an oxygen-containing gas is fed to an oxidizer-electrode(cathode). The fuel is oxidized at the anode to produce protons and the oxygen is reduced at the cathode to form water, thereby generating electricity, as shown in the following formulas.
Anode reaction (in the case of hydrogen):

$$H_2 \rightarrow 2H^+ + 2e^-$$

Cathode reaction:

$$1/2 O_2 + 2H^+ + 2e^- \rightarrow H_2O$$

Total reaction (in the case of hydrogen):

$$H_2 + 1/2 O_2 \rightarrow H_2O$$

At the anode and cathode, electrocatalysts are used for accelerating the respective electrode reactions. As the electrocatalysts, there have hitherto been used platinum alone; a combination of platinum with at least one selected from palladium, rhodium. iridium, ruthenium, osmium and gold; a combination of platinum with at least one selected from base metals such as tin, tungsten, chromium, manganese, iron, cobalt, nickel, copper and the like. The electrocatalysts have been used in the form of powder of elementary metal or alloy which are optionally supported on conductive carbon particles.

Generally in the fuel cells (reformed gas fuel cells), there are used hydrogen-enriched gases which are obtained by previously reforming fuels such as alcohols and hydrocarbons by means of a reformer. However, in the electrodes of proton-conductive electrolyte fuel cells which work or operate at low temperatures, impurities such as carbon monoxide and carbon dioxide contained in fuel gasses poison platinum contained in the electrocatalyst to increase polarization and lower the output power of the cell. As a solution of this problem, it is reported to use platinum as an alloy of platinum with ruthenium, iridium, rhodium or the like (D. W. Mckee and A. J. Scarpellio Jr., J.Electrochem. Tech.,6 (1969)p.101). It is also disclosed that a catalyst comprising a platinum-ruthenium alloy with an atomic ratio of the platinum to the ruthenium being about 1:1 supported on conductive carbon particles, has a high poisoning resistance (Japanese Pre-examination Patent Publication (kokai) Nos. 6-260207 and 9-35723).

Meanwhile, with regard to direct methanol fuel cells in which methanol is directly fed to the anode in generation of electricity, it is disclosed that a catalyst comprising platinum and ruthenium each in the form of an elementary metal, supported together on conductive carbon particles (WO97/21256), or a catalyst comprising platinum and ruthenium which are supported together on conductive carbon particles, respectively, in the form of an elementary metal and oxides (Japanese Pre-examination Patent Publication (kokai) No. 3-22361) show higher performance than the platinum-ruthenium alloy catalyst.

However, the conventional platinum-ruthenium binary anode catalyst is not sufficient in performance and therefore has been required to improve the performance. Especially, the alloy anode catalyst is low, as an anode catalyst used in reformed gas fuel cells, in poisoning resistance to carbon monoxide, so that it has a defect of a large anode-polarization. The alloy anode catalyst is also required, as an anode catalyst used in direct methanol fuel cells, to considerably lower the anode polarization.

SUMMARY OF THE INVENTION

Accordingly, an object of the present invention is to provide an electrocatalyst having an excellent poisoning resistance to carbon monoxide for use in solid polymer electrolyte fuel cells, and to provide an electrode, a membrane-electrode assembly, and a solid polymer electrolyte fuel cell using said electrocatalyst.

The present inventors studied earnestly in order to satisfy the above requirements raised in the prior art, and have found that in platinum-ruthenium binary catalysts, a catalyst comprising a cubic platinum-ruthenium solid solution alloy and a hexagonal-ruthenium supported together on a conductive carbon carrier accomplishes the above object. Thus, the present invention has completed.

Specifically. the present invention provides an electrocatalyst for use in solid polymer electrolyte fuel cells, comprising a cubic platinum-ruthenium solid solution alloy and a hexagonal ruthenium supported together on a conductive carbon carrier.

The present invention also provides an electrode for use in solid polymer electrolyte fuel cells, comprising a water repellent-treated support substrate of a conductive and porous carbon and a catalyst layer containing said electrocatalyst of this invention and polymer electrolyte particles and formed on one side surface of said support substrate.

Further, the present invention provides a membrane-electrode assembly for use in solid polymer electrolyte fuel cells, comprising a solid polymer electrolyte membrane, a catalyst layer containing said electrocatalyst and polymer electrolyte particles, and a conductive and porous support substrate;

said catalyst layer and said support substrate having been formed in this order on both of the side surfaces of said solid polymer electrolyte membrane, wherein one set of the catalyst layer and the support substrate on one side of the solid polymer electrolyte membrane forms anode and another set of the catalyst layer and the support substrate on the other side of the solid polymer electrolyte membrane forms cathode, wherein at least one of said catalyst layers contains the electrocatalyst of the present invention.

Still further, the present invention provides a solid polymer electrolyte fuel cell, comprising said membrane-electrode assembly, an anode gas-distribution plate formed on the support substrate of the anode, and a cathode gas-distribution plate formed on the support substrate of the cathode of said membrane-electrode assembly.

The electrocatalyst of the present invention for use in solid-polymer electrolyte fuel cells has an excellent poisoning resistance to carbon monoxide. Thus, it reduces necessity for removing carbon monoxide in a fuel reformer connected to a fuel cell and the fuel reformer can be simplified and small-sized. In addition to such technical advantages, a large economical advantage is obtained as a propulsion power source for transportation means.

BRIEF DESCRIPTION OF THE DRAWING

In the accompanying drawing.

PREFERRED EMBODIMENTS OF THE INVENTION

Electrocatalyst

The electrocatalyst of the present invention is comprised of a platinum (Pt)-ruthenium (Ru) cubic solid solution alloy (hereinafter, referred to as "the present alloy") and a hexagonal ruthenium supported together on a conductive carbon. This electrocatalyst shows, when measured by the powder X-ray diffraction using CuK α-ray (hereinafter, referred to as "XRD"), the (111) diffraction peak (main diffraction peak) of the present alloy at $2\theta=39.9°$ to $40.7°$, the (220) diffraction peak of the present alloy at $2\theta=67.8°$ to $68.7°$, the (101) diffraction peak (main diffraction peak) of the hexagonal ruthenium at $2\theta=43.70°$ to $43.97°$ and the (110) diffraction peak of the hexagonal ruthenium at $2\theta=68.90°$ to $69.35°$. The electrocatalyst of the present invention preferably has a peak intensity ratio of the (111) diffraction peak of the present alloy to the (101) diffraction peak of the hexagonal ruthenium being in the range of 1:5 to 5:1. When the peak intensity ratio is too small, the hydrogen-oxidizing activity of the anode catalyst may be lowered. When the peak intensity ratio is too large, the poisoning resistance of the anode catalyst to carbon monoxide may be lowered.

Incidentally, when Pt alone is supported on a conductive carbon carrier, the face-centered cubic Pt exhibits the (111) diffraction peak at $2\theta=39.2°$ and the (220) diffraction peak at $2\theta=67.5°$. The formation of the present alloy of platinum with ruthenium reduces the crystal lattice constant. On the other hand, when Ru alone is supported on a conductive carbon carrier, the hexagonal Ru exhibits the (101) diffraction peak and (110) diffraction peak at $2\theta=43.9°$ and $2\theta=69.30°$, respectively. When these diffraction peaks are overlapped, the existence of each peak can be confirmed and each of their relative intensities can be measured by the peak separation method.

It can be confirmed by an analytical electron microscope which is a combination of a transmission electron microscope with an energy dispersive X-ray analyzer that the present alloy and the hexagonal ruthenium are together supported on a conductive carbon carrier in the electrocatalyst of the present invention. The compositional ratio of Pt to Ru constituting individual metal particles on the conductive carbon carrier powder conforms substantially to the atomic ratio of Pt to Ru contained in the whole catalyst. The simple mixture of a catalyst comprising Pt alone supported on a conductive carbon carrier and a catalyst comprising a hexagonal Ru alone supported on a conductive carbon carrier, exhibits non-uniform composition between these metal particles by observation with an electron microscope. The merely physically mixed catalyst exhibits poor poisoning resistance to carbon monoxide when used as an anode catalyst.

The diameter of crystallites of the present alloy and that of crystallites of the hexagonal ruthenium measured by XRD are preferably 10 to 100 Å, and more preferably 10 to 80 Å. When the crystallite diameter is too small, the catalytic activity per surface area of metal may be lowered. When the crystallite diameter is too large, the surface area of the alloy may be decreased to lower the catalytic activity per unit weight of metal.

The total amount of Pt and Ru supported on a conductive carbon carrier is preferably 10 to 80% by weight, and more preferably 20 to 60% by weight, based on the weight of the electrocatalyst.

If the total amount of Pt and Ru is smaller than 10% by weight, a good dispersion of the alloy on the carrier and a large surface area of the alloy can be obtained, but the catalytic activity per unit weight of the catalyst may be lowered and therefore a large amount of catalyst may be required to obtain a desired output power density. If the total amount of Pt and Ru is larger than 80% by weight, the catalytic activity per unit weight of catalyst may be increased and therefore only a small amount of catalyst may be sufficient to obtain a desired output power density, but a bad dispersion of the alloy on the carrier and a small surface area of alloy may be obtained.

The conductive carbon used as the carrier of the electrocatalyst of the present invention includes the conventional carbon power such as carbon black, acetylene black and graphite. The specific surface area of conductive carbon is preferably 40 to 2.000 m$^2$/g, and more preferably 100.to 1,300 m$^2$/g although not limited thereto.

In order to support a metal in the state of good dispersion on a carrier, it is preferred that the specific surface area of conductive carbon is as large as possible. However, with an increase in the specific surface area, a degree of graphitization of conductive carbon lowers and thus the conductivity lowers. Further, a conductive carbon having a large specific surface area and a low degree of graphitization is liable to undergo oxidation and corrosion, so that it lacks in stability as the carrier.

The degree of graphitization of conductive carbon can be evaluated from the crystallite diameter of graphite (002) and the interlattice distance of graphite c (002) measured by XRD.

Carriers preferably used in the electrocatalyst of the present invention include a conductive carbon having a graphite (002) crystallite diameter of 6 Å or more and a graphite c (002) interlattice distance of 3.7 Å or less.

Now, a process for preparing the electrocatalyst of the present invention will be described below.

The electrocatalyst is prepared by (1) the step of supporting Pt on a conductive carbon carrier, (2) the step of supporting Ru on the Pt-supported conductive carbon, and (3) the step of simultaneously forming the present alloy and the hexagonal ruthenium.

An example of this preparation process is as follows:

In the step of (1), 30 to 50% by weight, based on the weight of the catalyst, of Pt is supported on conductive carbon in the state of a good dispersion in which the crystallite diameter of Pt (111) is 20 Å or less. As a method for supporting Pt on conductive carbon, the conventionally known methods can be used. For example, there can be used a method including the steps of adding an aqueous solution of chloroplatinic acid, sodium thiosulfate and hydrogen peroxide to an aqueous slurry of a conductive carbon (Japanese Patent Publication (kokoku) No. 59-5012). Also, can be used a method including the steps of adding an aqueous ammine solution of platinum hydroxide to an aqueous slurry of conductive carbon, which has been acidified with acetic acid, and then reducing with formic acid (Japanese Pre-examination Patent Publication (kokai) No. 60-7941).

In the step of (2), Ru is supported in the state of an insoluble Ru compound or metallic Ru on the Pt-supported conductive carbon obtained in the step of (1) so that the amount of Ru supported is 10 to 50% by weight and the atomic ratio of Pt/Ru contained in the catalyst ranges from 1/4 to 3/2. As a method for supporting Ru on the Pt-supported conductive carbon, conventionally known methods can be also used. For example, there can be used a method including the steps of adding a solution of a Ru compound to an aqueous slurry of the Pt-supported conductive carbon, adjusting the pH so as to deposit ruthenium hydroxide on the Pt-supported conductive carbon, and reducing the ruthenium hydroxide with a reducing agent such as formic acid or hydrazine to fix the same (Japanese Pre-examination Patent Publication (kokai) No. 63-48760). In the Pt and Ru-supported conductive carbon thus obtained, the Pt and Ru are not substantially alloyed.

In the step of (3), the Pt and Ru-supported conductive carbon obtained in the step of (2) is heat-treated to form the present alloy and the hexagonal Ru. In this heat-treatment, the treatment temperature and an atmosphere used are important. It is preferable to conduct the heat-treatment at 400 to 1,000° C. in a hydrogen-containing gas for 15 minutes to 5 hours so that the present alloy is formed of substantially all the Pt and a part of the Ru and that the remaining Ru is present in the hexagonal Ru. The condition of the heat-treatment is more preferably at 600 to 900° C. in a stream containing 5 to 50% by volume of hydrogen (the remainder: nitrogen) for 30 minutes to 2 hours.

The catalyst of the present invention can be used as the anode catalyst or cathode catalyst, and preferably the anode catalyst, for a solid polymer electrolyte fuel cell.

Electrode

The electrode (anode or cathode) for use in solid polymer electrolyte fuel cells according to the present invention is comprised of a support substrate of a water-repellent-treated conductive and porous carbon and a catalyst layer containing said electrocatalyst of the present invention and polymer electrolyte particles, said catalyst layer being formed on one side surface of the support substrate.

Usable support substrates of a conductive and porous carbon include, for example, carbon paper and carbon cloth.

For performing the water repellent-treatment of a support substrate, which forms a gas-diffusion layer, is generally used a water-repellent resin such as polytetrafluoroethylene, fluoroethylene-propylene copolymer and fluoroalkoxypolyethylene. It is alternatively possible to form a carbon powder layer comprised of conductive carbon powder and a water-repellent resin prior to forming the catalyst layer on one side surface of the support substrate. In that case, the carbon powder layer and the support substrate form a gas-diffusion layer.

The polymer electrolyte normally used includes proton-conductive polymers having a cation exchange group such as a sulfonic acid group or a carboxylic acid group in side chains. Specific examples of the polymers include perfluoro polymers having sulfonic acid groups, hereinafter referred to as perfluoro sulfonic acid polymer, such as tetrafluoroethylne-perfluorovinylether copolymers having sulfonic acid groups shown by the following general formula:

wherein m and n are each an integer, x is an integer of 0 to 3 and y is an integer of 1 to 5.

Among them, preferred is perfluoro sulfonic acid polymer which is commercially available from Aldrich Co. as a solution under the trade name of Nafion.

Conductive carbon powder used includes the same conductive carbon powder as exemplified as the carrier in the electrocatalyst of the present invention.

As methods for producing the electrode of the present invention for use in solid polymer electrolyte fuel cells, the conventionally known methods can be used, without any limitation.

For example, first, a support substrate is immersed in an aqueous solution of a water-repellent resin and dried at 60 to 100° C., followed by calcining at 250 to 350° C. for water repellent-treatment. Subsequently, a slurry or paste containing conductive carbon powder and a water-repellent resin is prepared, and then coated on one side surface of the water repellent-treated support substrate to a carbon powder layer in which the conductive carbon powder and the water-repellent resin have been mixed. Further, said electrocatalyst is mixed with polymer electrolyte particles or a solution of polymer electrolyte previously prepared to form as slurry or paste. Then, the slurry or paste is coated on the above conductive carbon layer and air dried, followed by further drying at 60 to 100° C. for forming a catalyst layer containing said electrocatalyst and polymer electrolyte particles. As an alternative method for forming the catalyst layer containing said electrocatalyst and polymeric electrolyte particles on the carbon powder layer, there is a method in which a slurry or paste is prepared from said eleotrocatalyst and a water-repellent resin and coated on the carbon powder layer, followed by immersing in or coating a solution of a polymer electrolyte which solution is previously prepared. Subsequently, the product coated is air dried at room temperature and further dried at 60 to 100° C.

In the above production method, the catalyst layer can be formed directly on the water repellent-treated support substrate without forming the carbon powder layer. In this case, a water-repellent resin is preferably added to the catalyst layer.

The coating methods used include, for example, spray coating, filtration, roll-coating and printing.

The thickness of the support substrate is generally 50 to 400 μm or less, and preferably 150 to 350 μm, and the thickness of the carbon powder layer is generally 100 μm or less, and preferably 70 μm or less. The thickness of the catalyst layer is generally 5 to 120 μm, and preferably 10 to 70 μm.

The thus produced electrode of the present invention can be used as an anode and a cathode, and preferably an anode. Alternatively, the electrode of the present invention and another electrode, for example, an electrode using a Pt alone-supported conductive carbon catalyst can be used as an anode and a cathode, respectively.

Membrane-electrode Assembly for Use in Solid Polymer Electrolyte Fuel Cells

The membrane-electrode assembly of the present invention is comprised of a catalyst layer containing an electrocatalyst and polymer electrolyte particles and a conductive and porous support substrate, in this order, formed on each of both side surfaces of a solid polymer electrolyte membrane. Each catalyst layer formed on both said side surfaces or the catalyst layer formed on said one side surface is the catalyst layer used in the electrode of the present invention. Accordingly, the membrane-electrode assembly may be a structure in which the electrode of the present invention has formed on both side surfaces of a solid polymer electrolyte membrane or may be a structure in which the electrode of the present invention has formed on one side surface of a solid polymer electrolyte membrane while an electrode except for the electrode of the present invention has been formed on the other side surface of the solid polymer electrolyte membrane.

The solid polymer electrolyte membrane used herein is generally a membrane made of a polymer resin having a cation exchange group such as a sulfonic acid group or a carboxylic acid group in the side chain. Examples of the polymer for the electrolyte membrane is as exemplified above. Among them, preferred is perfluoro sulfonic acid polymer which is commercially available from E. I. Du Pont de Nemourx and Company as a membrane under the trade name of Nafion 112, 115 and 117; and from Asahi Kasei K. K. as a membrane under the trade name of Aciplex EW900.

As methods for producing the membrane-electrode assembly of the present invention, the conventionally known methods can be used, without particular limitation.

For example, in the case of forming the electrode of the present invention only on one side surface of the solid polymer electrolyte membrane, the side of the catalyst layer of the electrode according to the present invention is superimposed on the surface of the solid polymer electrolyte membrane and then adhered under pressure to produce said member. In the case of forming the electrode of the present invention on both side surfaces of the solid polymer electrolyte membrane, the electrode of the present invention is superimposed on each of both side surfaces of the solid polymer electrolyte membrane, as aforementioned, and then adhered under pressure. In the case of forming the electrode of the present invention on one side surface of the solid polymer electrolyte membrane and forming another electrode except for the electrode of the present invention on the other side surface, the electrode of the present invention is superimposed on one side surface of the solid polymer electrolyte membrane and another electrode except for the electrode of the present invention is superimposed on the other side surface, as aforementioned, and then adhered under pressure.

As an alternative production method of the membrane-electrode assembly of the present invention, there can be enumerated, for example, a method in which a catalyst layer containing the catalyst of the present invention and polymer electrolyte particles is formed on one side surface or both side surfaces of a solid polymer electrolyte membrane is formed and the water repellent-treated support substrate is superimposed on the catalyst layer or each of the catalyst layers, followed by adhering under pressure. Optionally, the carbon layer containing conductive carbon powder and a water-repellent resin may be previously formed on the surface of the support substrate to be superimposed.

As methods for forming the catalyst layer containing said electrocatalyst and a polmer electrolyte particle, there can be enumerated, for example, a method in which a slurry or paste is prepared by mixing the catalyst and polymer electrolyte particles and optionally further adding a pore-forming agent thereto, and coated on one side surface or both side surfaces of the solid polymer electrolyte membrane, followed by air drying at room temperature and further drying at 60 to 100° C. In the case of using a pore-forming agent, the catalyst layer is formed and then either the pore-forming agent contained in the layer is dissolved in a solvent such as water or the pore-forming agent is calcined and decomposed at 150 to 250° C. for removal. The coating methods used include, for example, screen-printing, doctor blade-coating and roll coater-coating but are particularly limited thereto. The pore-forming agents used include, for example, ammonium carbonate and polyvinyl alcohol.

In the thus produced membrane-electrode assembly of the present invention, one of the electrodes is an anode while the other of the electrodes is a cathode. Also in the membrane-electrode assembly in which the electrode of the present invention has been formed on both side surfaces of the solid polymer electrolyte membrane, one of the electrodes is an anode while the other of the electrodes is a cathode. In the membrane-electrode assembly in which the electrode of the present invention has been formed on one side surface of the solid polymer electrolyte membrane and another electrode except for the electrode of the present invention has been formed on the other side surface, the electrode of the present invention can be used as an anode or a cathode depending on the functions of another electrode except for the electrode of the present invention. In this case, it is preferred that, for example, an electrode having a Pt alone-supported conductive carbon catalyst is used as a cathode while the electrode of the present invention is used as an anode.

Solid Polymer Electrolyte Fuel Cell

The solid polymer electrolyte fuel cell of the present invention is comprised of an anode gas-distribution plate and a cathode gas-distribution plate respectively located on each support substrate (a gas-diffusion layer) of an anode and a cathode of the membrane-eleotrode assembly of the present invention. The anode gas-distribution plate and the cathode gas-distribution plate each serve also as a current collector.

The gas-distribution plates used include those conventionally used. For example, there can be used a gas-distribution plate, which is also served as a current collector, comprising grooves having a desired depth for gas-distribution formed on the desired portion of one side surface of a gas-impermeable dense carbon plate, and a gasket for gas-sealing formed on the circumferences of the grooves. The gasket for gas-sealing used includes a packing made of a fluoroplastic, such as a polytetrafluoroethylene sheet and an O-ring made of vinylidene fluoride/hexafluoropropylene copolymer.

In order to manufacture the fuel cell of the present invention as a single cell, two gas-distribution plates are prepared, the surface having grooves of each of the gas-distribution plates is fitted to each gas-diffusion layer of the anode and cathode of the membrane-electrolyte assembly so that the surface having grooves comes into contact with the gas-diffusion layer, and then the gas-distribution plates present in both sides of the resulting assembly is put and fixed between two metal plates, such as stainless steel plates, each having a gas feed inlet and a gas discharge outlet. A stacked cell can be manufactured by forming a reaction-gas flowing path on both side surfaces (one allowing the anode gas to pass and the other allowing the cathode gas to pass) of a separator-bipolar plate, composed of gas-impermeable dense carbon substances, and then connecting adjacent unit cells to each other in series. Further, a coolingtube can be embedded in every several cells to remove a heat of reaction caused by the cell reaction and to recover the heat.

In order to operate the fuel cell of the present invention, while heated steam is passed into the gas feed inlet of each electrode of the anode and cathode to moisten the electrolyte membrane, air or oxygen is supplied to the cathode and a reformed gas (a hydrogen-enriched gas produced by reforming a fuel such as alcohol or hydrocarbon) is supplied to the anode.

Since the fuel cell of the present invention is excellent in poisoning resistance to carbon monoxide, the fuel cell has a characteristic capable of keeping a high direct-current electromotive force.

For example, a solid polymer electrolyte fuel cell using a conventional electrocatalyst in an anode may provide a high terminal voltage of 0.5 to 0.6 V at a current density of 500 to 1,000 mA/cm$^2$ when air is supplied to the cathode and a hydrogen gas free of carbon monoxide is supplied to the anode containing an electrocatalyst comprised of, for example, a Pt alone-supported conductive carbon. However, when a hydrogen gas such as a reformed gas contains carbon monoxide in a concentration of several ten ppm, there is observed a drop of 100 mV or more in terminal voltage at a current density of, for example, 500 mA/cm$^2$. On the contrary, in a solid polymer electrolyte fuel cell using the electrocatalyst of the present invention in an anode, a drop in terminal voltage is only several ten mV even when the concentration of carbon monoxide contained in a reformed gas exceeds several ten ppm, and In some cases, 100 ppm, and a high output power density Is kept.

EXAMPLES

The present invention will be explained with reference to working examples without particularly limiting thereto. In working examples and comparative examples, "%" represents "% by weight" unless otherwise stated.

Example 1

(1) Preparation of Pt-supported Carbon Powder 50 g of an acetylene black having a BET specific surface area of 250 m$^2$/g (trade name: C-250, produced by DENKI KAGAKU KOGYO K.K.) were charged into 1 liter of deionized water to form a slurry. Then, 100 ml of glacial acetic acid were added thereto, and the slurry was heated with stirring and stirred at 95° C. for one hour. After cooling, the slurry was filtered and the resulting residue was washed with deionized water until the pH of the water after washing reached 7. The washed carbon obtained was charged into 2 liters of deionized water to form a slurry. To the slurry, 14 ml of glacial acetic acid was added and then 500 ml of an aqueous ammine solution of a platinum hydroxide containing 33 g as Pt was dropwise added over one hour with stirring. Subsequently, the slurry liquid was heated and 330 ml of an aqueous solution containing 9.4 ml of 99% formic acid was dropwise added thereto at 95° C. over 30 minutes. After the end of the adding, the slurry liquid was stirred for additional 30 minutes. Thereafter, the slurry liquid was cooled to room temperature and filtered, followed by washing the resulting residue with deionized water. The thus obtained cake was dried in a vacuum dryer at 95° C. for 16 hours and then pulverized in nitrogen atmosphere to obtain 40% Pt-supported carbon powder.

(2) Preparation of Pt- and Ru-supported Carbon Catalyst 83 g of the 40% Pt-supported carbon powder obtained in the (1) were charged into 2.7 liters of deionized water to form a slurry. To the slurry, 340 ml of an aqueous solution containing deionized water and a ruthenium chloride containing 17 g as Ru was dropwise added over 15 minutes with stirring. Then, to the slurry liquid, a 2.5% aqueous solution of sodium hydrogen carbonate was added over one hour to adjust the pH of the liquid to 7 and heated at 50° C., followed by maintaining at this temperature for 30 minutes. Next, to the liquid, 500 ml of an aqueous solution containing deionized water and 12.6 g of hydrazine hydrate were dropwise added over 30 minutes. Thereafter, the liquid was cooled to room temperature and filtered, followed by washing with deionized water. The thus obtained cake was dried in a vacuum dryer at 95° C. for 16 hours and then pulverized in nitrogen atmosphere. The resulting powder was then heated In a stream containing 10% by volume of hydrogen (the remainder: nitrogen) at 850° C. for one hour to prepare a 33% Pt- and 17% Ru-supported carbon catalyst (A-1). The measurement of the catalyst by XRD showed that the (111) diffraction peak of the present alloy was present at $2\theta=39.8\%$ and the (101) diffraction peak of the hexagonal ruthenium was present at $2\theta=43.95\%$. Thus, the peak intensity ratio of the diffraction peak of the former to the diffraction peak of the later was 2:1. The crystallite diameter of the present alloy and that of the hexagonal ruthenium were 50 Å and 85 Å, respectively. Further, the measurement of the catalyst by the X-ray photoelectron spectroscopy showed that the peak of Ru 3d 5/2 was present at about 280 eV to presume that Ru was in the metallic state.

Example 2

(1) Preparation of Pt-supported Carbon Powder

33% Pt-supported carbon powder was obtained in the same manner as (1) in Example 1, except that 50 g of acetylene black were replaced with 67 g of a ketchen black having a BET specific surface area of 1,300 M$^2$/g (trade name: EC-DJ600, produced by Mitsubishi Kagaku K.K.).

(2) Preparation of Pt- and Ru-supported Carbon Catalyst

25% Pt- and 35% Ru-supported carbon catalyst (A-2) was obtained in the same manner as (2) in Example 1, except that 83 g of 40% Pt-supported carbon powder were replaced with 60 g of the 33% Pt-supported carbon powder obtained in the (1) and the ruthenium chloride containing 17 g as Ru was replaced with a ruthenium chloride containing 40 g as Ru.

Figure 1:
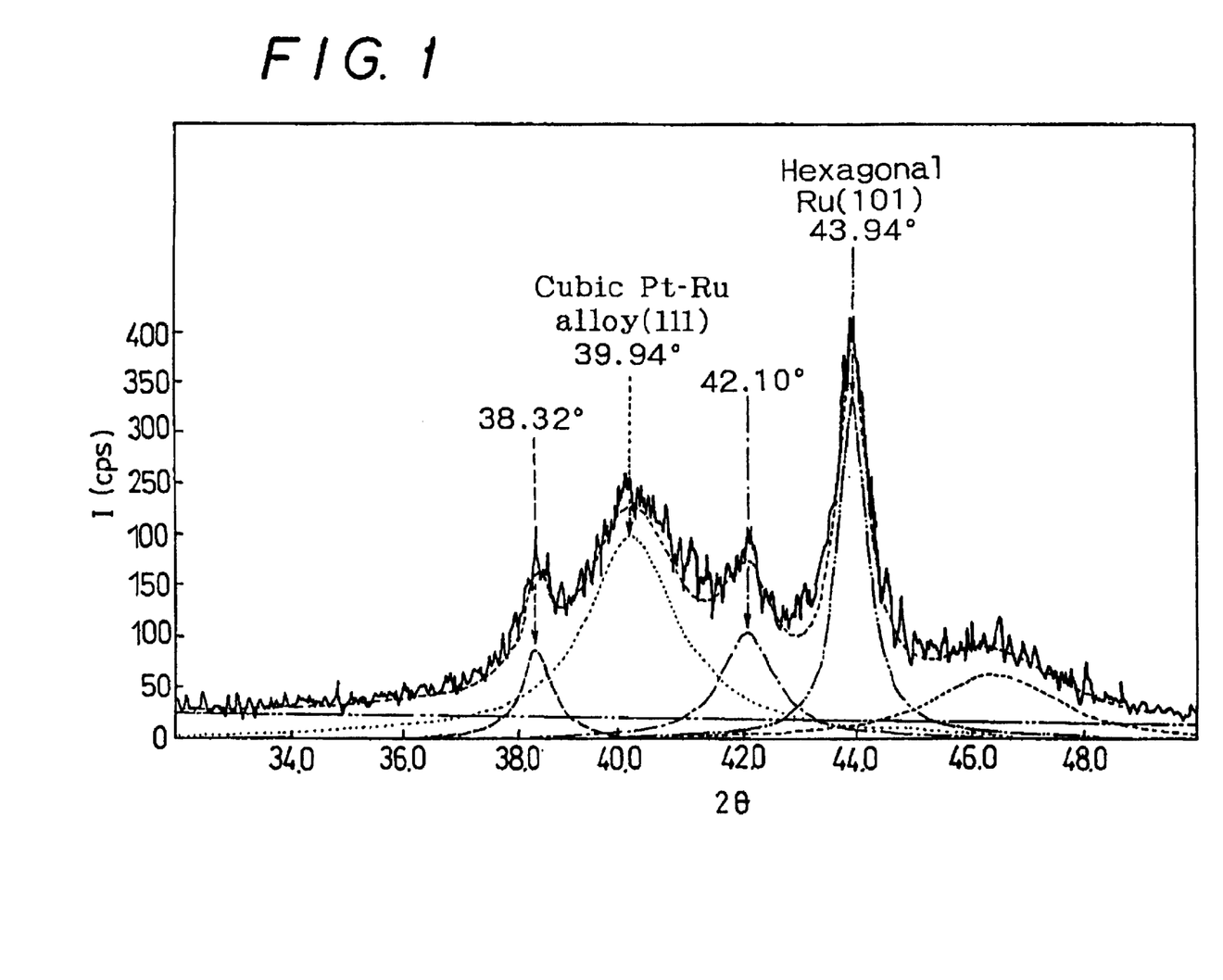
FIG. 1 is a X-ray diffraction graph of the electrocatalyst prepared in Example 2.

The measurement of the catalyst by XRD gave the results as shown in FIG. 1, in which multiple peaks were present at $2\theta=38°$ to 44°. These peaks were analyzed by peak separation method to find that the (100) diffraction peak of the hexagonal ruthenium was present at $2\theta=38.32°$, the (111) diffraction peak of the present alloy at $2\theta=39.94°$, the (002) diffraction peak of the hexagonal ruthenium at $2\theta=42.10°$, and the (101) diffraction peak of the hexagonal ruthenium at $2\theta=43.94°$. Thus, the peak intensity ratio of the (111) diffraction peak at $2\theta=39.94°$ of the present alloy to the (101) diffraction peak at $2\theta=43.94°$ of the hexagonal ruthenium was 1:2.5. The crystallite diameter of the present alloy and that of the hexagonal ruthenium were 46 Å and 72 Å, respectively.

Example 3

(1) Preparation of Pt-supported Carbon Powder

Carbon black (trade name: Vulcan-XC-72R, produced by Cabot Co.) was heat-treated In vacuum to prepare a partially graphitized carbon black having a BET specific surface area of 120 m$^2$/g. Next, 22% Pt-supported carbon powder was obtained in the same manner as (1) in Example 1, except that 50 g of acetylene black were replaced with 70.2 g of the partially graphitized carbon black and the aqueous ammine solution of a platinum hydroxide containing 33 g as Pt was replace with an aqueous ammine solution of a platinum hydroxide containing 19.8 g as Pt.

(2) Preparation of Pt- and Ru-supported Carbon Catalyst

20% Pt- and 10% Ru-supported carbon catalyst (A-3) was obtained in the same manner as (2) in Example 1, except that 83 g of the 40% Pt-supported carbon powder were replaced with 90 g of the 22% Pt-supported carbon powder obtained in the (1) and the ruthenium chloride containing 17 g as Ru was replaced with a ruthenium chloride containing 10 g as Ru. The measurement of the catalyst by XRD showed that the (111) diffraction peak of the present alloy was present at $2\theta=39.93°$ and the (101) diffraction peak of the hexagonal ruthenium was present at $2\theta=43.95°$. Thus, the peak intensity ratio of the diffraction peak of the former to the diffraction peak of the later was 3:1. The crystallite diameter of the present alloy and that of the hexagonal ruthenium were 45 Å and 83 Å, respectively.

Example 4

(1) Preparation of Pt-supported Carbon Powder

25% Pt-supported carbon powder was obtained in the same manner as (1) in Example 1, except that 50 g of acetylene black were replaced with 60 g of a carbon black (trade name: CE-D, produced by Mitsubishi Kagaku K.K.) having a BET specific surface area of 850 $m^2/g$ and the aqueous ammine solution of a platinum hydroxide containing 33 g as Pt was replace with an aqueous ammine solution of a platinum hydroxide containing 20 g as Pt.

(2) Preparation of Pt- and Ru-supported Carbon Catalyst

20% Pt- and 20% Ru-supported carbon catalyst (A-4) was obtained in the same manner as (2) in Example 1, except that -83 g of the 40% Pt-supported carbon powder were replaced with 80 g of the 25% Pt-supported carbon powder obtained in the (1) and the ruthenium chloride containing 17 g as Ru was replaced with a ruthenium chloride containing 20 g as Ru. The measurement of the catalyst by XRD showed that the (111) diffraction peak of the present alloy was present at $2\theta=40.02°$ and the (101) diffraction peak of the hexagonal ruthenium was present at $2\theta=43.96°$. Thus, the peak intensity ratio of the diffraction peak of the former to the diffraction peak of the later was 1:1.5. The crystallite diameter of the present alloy and that of the hexagonal ruthenium were 31 Å and 79 Å, respectively.

Comparative Example 1

The 40% Pt-supported carbon powder obtained in the (1) of Example 1 was prepared as the catalyst (C-1) of Comparative Example 1.

Comparative Example 2

In accordance with the method described in D. W. Mackee and A. J. Scarpellio, Jr., J. Electrochem. Tech., 6(1969) p.101, 50 g of a carbon black having a BET specific surface area of 230 $m^2/g$ (trade name: Vulcan-XC-72R, produced by Cabot Co.) were charged into 1.5 liters of deionized water to form a slurry. Next, to the slurry, 330 ml of an aqueous solution of a chloroplatinic acid ($H_2PtCl_6$) containing 33 g as Pt and 170 ml of an aqueous solution of a ruthenium chloride containing 17 g as Ru were added. Then, the slurry was heated at 80 to 95° C. in vacuum to evaporate to dryness. The thus obtained cake was pulverized and then reduced in a stream of 100% (% by volume) hydrogen at 125° C. for 3 hours to prepare 33% Pt- and 17% Ru-supported carbon catalyst (C-2). The measurement of the catalyst by XRD showed that the (111) diffraction peak in broad width of the Pt—Ru alloy was present at $2\theta=39.8°$. The crystallite diameter of the alloy was 27 Å. No peaks originating from hexagonal ruthenium were detected in the vicinity of $2\theta=44°$ and that of $2\theta=69°$.

Comparative Example 3

In accordance with the method described in Japanese Pre-examination Patent Publication (kokai) No. 3-22361, 33 g of sodium hydrogen sulfite was charged into 1 liter of an aqueous solution of a chloroplatinic acid containing 3.3 g as Pt and then an aqueous solution of 30% hydrogen peroxide was added thereto. Next, an aqueous solution of sodium hydroxide was added to adjust the pH of the liquid. While stirring the resulting colloidal solution by means of ultrasonic wave, 200 ml of an aqueous solution of a ruthenium chloride containing 1.7 g as Ru was dropwise added thereto. Subsequently, 5.0 g of the same acetylene black as used in the (1) of Example 1 was added to the liquid, followed by stirring for 16 hours to form a slurry. The slurry was filtered and the thus obtained cake was washed with water, dried, pulverized and then heat-treated in nitrogen stream at 300° C. for one hour to prepare a 33% Pt- and 17%Ru-supported carbon catalyst (C-3). The measurement of the catalyst by XRD showed that the diffraction peaks originating from Pt (111) and Pt (220) were present at $2\theta=39.50$ and $2\theta=67.5°$, respectively. From the values, it was presumed that Pt and Ru were not substantially alloyed and Pt was present singly. Ru was not detected as metal and also as $RuO_2$. The crystallite diameter of the Pt was 20 Å. Further, the measurement of the catalyst by the X-ray photoelectron spectroscopy showed that the peak of Ru 3d 5/2 was present at about 281 to 283 eV to presume that Ru was in the form of an amorphous oxide comprised of $RuO_2$, $RuO_3$ or a mixture thereof.

Example 5

A carbon paper measuring 0.18×60×60 mm (trade name: TGP-H-060, produced by TORAY K.K.) was immersed into a 5% PTFE (polytetrafluoroethylene) dispersion obtained by diluting 30 g of PTFE dispersion(trade name: Teflon 30-J. produced by Mitsui Fluorochemical K.K.) with 360 ml of deionized water. Subsequently, the carbon paper was filtered and then sucked, and the carbon paper thus dried was calcined at 350° C. for 30 minutes to prepare a water-repellent carbon paper containing PTFE in an amount of 5%.

57.6 mg of the catalyst (A-1) (the total weight of Pt and Ru contained in the catalyst: 28.8 mg) 0.49 g of the 5% PTFE dispersion and 30 ml of deionized water were mixed and dispersed by means of an ultrasonic dispersion apparatus to form a uniform slurry.

Using a handy spray gun, the slurry was coated on the whole one side surface of the water-repellent carbon paper obtained in the above. Next, the carbon paper coated was dried at room temperature and then calcined at 280° C. for 30 minutes to prepare a catalyst layer comprised of the catalyst and PTFE. A liquid obtained by diluting 1.0 ml of a 5% Nafion solution (produced by Aldrich Co.) with 0.7 ml of deionized water was coated on the whole surface of said catalyst layer and air dried at room temperature for one hour, followed by further drying at 80° C. for one hour to prepare an electrode (AE-1) having a catalyst layer containing 0.8 mg/$cm^2$ of Pt+Ru, 0.7 mg/$cm^2$ of the polymeric electrolyte and 0.7 mg/cm of water-repellent resin.

Examples 6–8 and Comparative Examples 4–6

Electrodes (AE-2), (AE-3) and (AE-4) of Examples were prepared in the same manner as in Example 5 using the catalysts (A-2), (A-3) and (A-4), respectively. Likewise, electrodes (CE-1), (CE-2) and (CE-3) of Comparative Examples were prepared in the same manner as in Example 5 using the catalysts (C-1), (C-2) and (C-3), respectively.

The catalyst layer of the electrode (AE-1) obtained in Example 5 was superimposed on a perfluoro sulfonic acid polymer membrane proton-exchanged measuring 0.1×80×80 mm (trade name: Nafion 112, produced by E. I. du Pont de Numours and Co.) and further the electrode (CE-1) was superimposed on the polymer membrane so that the catalyst layer of the electrode was contacted with the polymer membrane. Thereafter, the resulting assembly was heated and pressed at 130° C. under a pressure of 100 kg/cm$^2$ using a hot-press for 10 minutes to produce a membrane-electrode assembly (MAE-1) using the electrode (AE-1) as an anode and the electrode (CE-1) as a cathode.

Examples 10–12 and Comparative Examples 7–9

The membrane-electrode assemblies (MAE-2), (MAE-3) and (MAE-4) of Examples were produced in the same manner as in Example 9 except for using the Electrodes (ME-2), (ME-3) and (ME-4) as an anode, respectively. Likewise, the membrane-electrode assemblies (MCE-1), (MCE-2) and (MCE-3) of Comparative Examples were produced in the same manner as in Example 9 except for using the Electrodes (CE-1), (CE-2) and (CE-3) as an anode, respectively.

Evaluation Examples of Performance

Grooves for gas-distribution were formed at a pitch of 2 mm on a square portion 60×60 mm of one side surface of a dense carbon plate, and an O-ring made of vinylidene fluoride-hexafluoropropylene copolymer (trade name: Byton, produced by E. I. du Pont Numours and Co.) was fitted to the circumferences of said grooves to produce two gas-distribution plates for serving also as a current collector plate. Then, the surface having grooves of each of the gas-distribution plates was fitted to each gas-diffusion layer of the anode and cathode of the membrane-electrode assembly (MAE-1) as produced above so that the surface having grooves was contacted with the gas-diffusion layer, and then the gas-distribution plates present in both sides of the resulting assembly were inserted and fixed between two stainless steel plates each having a gas feed inlet and a gas discharge outlet, followed by fastening several terminal ends of each stainless steel plate with bolts to produce a solid polymer electrolyte fuel cell as an single cell having an effective electrode area of 36 cm$^2$.

The single cell was heated to 70° C. and, while supplying heated steam from a bubbling humidifier, heated at 80° C. to the gas feed inlet of each electrode of the anode and the cathode of the single cell, hydrogen gas was supplied to the anode at 120 ml/min through the humidifier and oxygen gas was supplied to the cathode at 120 ml/min. At this time, the terminal voltage (V1) in the steady state of a current density being 500 mA/cm$^2$ was 605 mV.

Next, the hydrogen gas was replaced with a mixed gas of hydrogen and a carbon monoxide in a concentration of 30 ppm, and the mixed gas was supplied for 5 hours. At this time, the terminal voltage (V2) at a current density of 500 mA/cm$^2$ was 532 mV. From the difference: V1−V2, the polarization due to the carbon monoxide having a concentration of 30 ppm was 73 mV. Polarization was measured in the same manner as above, except for replacing MAE-1 as the membrane-electrode assembly with MAE-2, MAE-3, MAE-4, MCE-1, MCE-2 or MCE-3. The results were shown in Table 1.

TABLE 1

| Anode catalyst | Membrane-electrode assembly in single cell | Polarization (mV) |
| --- | --- | --- |
| A-1(present alloy:Ru = 2:1) | MAE-1 | 73 |
| A-2(present alloy:Ru = 1:2.5) | MAE-2 | 62 |
| A-3(present alloy:Ru = 3:1) | MAE-3 | 81 |
| A-4(present alloy:Ru = 1:1.5) | MAE-4 | 77 |
| C-1(Pt alone) | MCE-1 | 400 |
| C-2(Pt-Ru alloy) | MCE-2 | 125 |
| C-3(Pt + amorphous RuO$_x$) | MCE-3 | 137 |

Note:
The value in parenthesis in each of Examples (A-1 to A-4) represents the peak intensity ratio of the diffraction peak of the present alloy to that of the hexagonal ruthenium measured by XRD. The metal in parenthesis in each of Comparative Examples (C-1 to C-3) represents the status of the metallic elements supported.

Table 1 showed that the single cell produced by using the anode containing the electrocatalyst of the present invention was extremely low in polarization and had an excellent poisoning resistance to carbon monoxide.

What is claimed is:

1. An electrocatalyst for use in solid polymer electrolyte fuel cells, comprising a cubic platinum-ruthenium solid solution alloy and a hexagonal ruthenium supported together on a conductive carbon carrier wherein said cubic platinum-ruthenium solid solution alloy and hexagonal ruthenium are present in mixture with one another.

2. The electrocatalyst according to claim 1, wherein said cubic solid solution alloy and said hexagonal ruthenium each have a crystallite diameter of 10 to 100 Å.

3. The electrocatalyst according to claim 1, wherein the total amount of said cubic solid solution a and said hexagonal ruthenium supported ranges from 10 to 80% by weight based on the electrocatalyst.

4. The electrocatalyst according to claim 1, which is used for an anode of said solid polymer electrolyte fuel cell.

5. An electrode for a solid polymer electrolyte fuel cell, comprising a water repellent-treated support substrate of a conductive and porous carbon and a catalyst layer containing the electrocatalyst of claim 1 and polymer electrolyte particles and formed on one side surface of said support layer.

6. The electrode according to claim 5, which is an anode of the solid polymer electrolyte fuel cell.

7. A membrane-electrode assembly for use in solid polymer electrolyte fuel cells, comprising a solid polymer electrolyte membrane, a catalyst layer containing an electrocatalyst and polymer electrolyte particles, and a conductive and porous support substrate;

said catalyst layer and said support substrate having been formed in this order on both side surfaces of said solid polymer electrolyte membrane, wherein one set of the catalyst layer and the support substrate on one side of the solid polymer electrolyte membrane forms anode and another set of the catalyst layer and the support substrate on the other side of the solid polymer electrolyte membrane forms cathode, wherein at least one of said catalyst layers contains the electrocatalyst as defined in claim 1.

8. A solid polymer electrolyte fuel cell, comprising said membrane-electrode assembly, an anode gas-distribution plate located to the support substrate of the anode, and a cathode gas-distribution plate located to the support substrate of the cathode of said membrane-electrode assembly as defined in claim 7.

9. The electrocatalyst according to claim 1, wherein the powder X-ray diffraction pattern with CuK α-radiation, for the Pt—Ru alloy shows a (111) diffraction peak at 2θ=39.9°–40.7° and a (220) diffraction peak at 2θ=67.8°–68.7°, and for the hexagonal ruthenium component the (101) diffraction peak is 2θ=3.70°–43.97° and the (110) diffraction peak is at 2θ=68.90°–69.35°.

10. The electrocatalyst according to claim 2, wherein said crystallite diameter ranges from 10–80 Å.

11. The electrocatalyst according to claim 3, wherein the amount of said hexagonal ruthenium ranges from 20–60% by weight.

12. The electrocatalyst according to claim 1, wherein said carbon carrier is carbon black, acetylene black or graphite powder having a specific surface area ranging from 40–2000 $m^2/g$.

13. The electrocatalyst according to claim 12, wherein said specific surface area ranges from 100–1300 $m^2/g$.

14. The electrocatalyst according to claim 1, wherein said conductive carbon carrier is graphite having a (002) crystallite diameter of 6 Å or more and an interlattice distance of 3.7 Å or less.

15. The electrode according to claim 5, wherein said support substrate is carbon paper or carbon cloth.

16. The electrode according to claim 5, wherein the material which provides said water repellant treatment of the support substrate is polytetrafluoroethylene, fluoroethylene-propylene copolymer or fluoroalkoxypolyethylene.

17. The electrode according to claim 5, wherein said support substrate has a thickness of 50–400 μm and a carbon powder layer of 100 μm or less.

18. The electrode according to claim 17, wherein said support substrate thickness ranges from 150–350 μm and said carbon powder layer has a thickness of 70 μm or less.

* * * * *